United States Patent
Singh et al.

(10) Patent No.: US 9,084,279 B1
(45) Date of Patent: Jul. 14, 2015

(54) DOWNLINK INTERFERENCE MITIGATION BASED ON UPLINK TRANSMISSION CONFIGURATION OF OTHER COVERAGE AREA

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Overland Park, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 300 days.

(21) Appl. No.: 13/800,217

(22) Filed: Mar. 13, 2013

(51) Int. Cl.
| | |
|---|---|
| *H04W 72/04* | (2009.01) |
| *H04W 72/08* | (2009.01) |
| *H04W 36/20* | (2009.01) |
| *H04W 24/10* | (2009.01) |
| *H04W 72/12* | (2009.01) |
| H04W 24/02 | (2009.01) |
| H04W 28/04 | (2009.01) |
| H04W 36/24 | (2009.01) |
| H04B 7/02 | (2006.01) |
| H04W 36/00 | (2009.01) |

(52) U.S. Cl.
CPC .......... *H04W 72/1263* (2013.01); *H04W 24/10* (2013.01); *H04B 7/026* (2013.01); *H04W 24/02* (2013.01); *H04W 28/048* (2013.01); *H04W 36/0088* (2013.01); *H04W 36/24* (2013.01); *H04W 72/082* (2013.01)

(58) Field of Classification Search
CPC ..... H04W 24/00; H04W 24/02; H04W 24/10; H04W 28/048; H04W 36/0011; H04W 36/14; H04W 36/18; H04W 36/24; H04W 36/20; H04W 36/0083; H04W 36/0088; H04W 36/0094; H04W 72/02; H04W 72/04; H04W 72/042; H04W 72/0426; H04W 72/082
See application file for complete search history.

(56) References Cited

U.S. PATENT DOCUMENTS

| | | | |
|---|---|---|---|
| 2005/0148368 A1 | 7/2005 | Scheinert et al. | |
| 2007/0099619 A1 | 5/2007 | Parekh et al. | |
| 2009/0117891 A1 | 5/2009 | Chou | |
| 2011/0199986 A1* | 8/2011 | Fong et al. | 370/329 |
| 2011/0249642 A1* | 10/2011 | Song et al. | 370/329 |
| 2012/0113847 A1* | 5/2012 | Narasimha et al. | 370/252 |
| 2012/0115469 A1* | 5/2012 | Chen et al. | 455/434 |
| 2012/0149362 A1* | 6/2012 | Tooher et al. | 455/423 |
| 2012/0236736 A1* | 9/2012 | Frank et al. | 370/252 |
| 2013/0194982 A1* | 8/2013 | Fwu et al. | 370/280 |
| 2013/0322235 A1* | 12/2013 | Khoryaev et al. | 370/229 |
| 2013/0343336 A1 | 12/2013 | Bai | |
| 2014/0169238 A1* | 6/2014 | Cai et al. | 370/280 |
| 2014/0200001 A1* | 7/2014 | Song et al. | 455/436 |
| 2014/0301251 A1 | 10/2014 | Chen et al. | |

FOREIGN PATENT DOCUMENTS

WO WO 2014/165654 10/2014

OTHER PUBLICATIONS

U.S. Appl. No. 13/663,022, filed Oct. 29, 2012.

* cited by examiner

*Primary Examiner* — Candal Elpenord

(57) ABSTRACT

A method and apparatus to help mitigate interference from an adjacent coverage area. A user equipment device (UE) determines a time division duplex (TDD) frame arrangement of a neighboring base station and reports the determined TDD frame arrangement to a serving base station. The serving base station uses the reported TDD frame arrangement of the neighboring base station as a basis to avoid scheduling downlink transmission of bearer traffic to the UE at times when the TDD frame arrangement of the neighboring base station defines uplink transmission.

19 Claims, 8 Drawing Sheets

DOWNLINK INTERFERENCE MITIGATION BASED ON UPLINK TRANSMISSION CONFIGURATION OF OTHER COVERAGE AREA

BACKGROUND

Unless otherwise indicated herein, the materials described in this section are not prior art to the claims and are not admitted to be prior art by inclusion in this section.

A typical cellular wireless system includes a number of base stations that radiate to define wireless coverage areas, such as cells and cell sectors, in which user equipment devices (UEs), such as cell phones, tablet computers, tracking devices, embedded wireless modules, and other wirelessly equipped communication devices, can operate. In turn, each base station is typically coupled with equipment that provides connectivity with one or more transport networks, such as the public switched telephone network (PSTN) and/or the Internet for instance. With this arrangement, a UE operating within a coverage area of any base station can engage in air interface communication with the base station and can thereby communicate via the base station with various remote network entities or with other UEs served by the base station.

In general, a cellular wireless system may operate in accordance with a particular air interface protocol or "radio access technology," with communications from the base stations to UEs defining a downlink (or forward link) and communications from the UEs to the base stations defining an uplink (or reverse link). Examples of existing air interface protocols include Orthogonal Frequency Division Multiple Access (OFDMA) (e.g., Long Term Evolution (LTE)), CDMA, WiMAX, iDEN, TDMA, AMPS, GSM, GPRS, UMTS, EDGE, MMDS, WI-FI, and BLUETOOTH. Each protocol may define its own procedures for initiation of calls, handoff between coverage areas, and functions related to air interface communication.

Depending on the air interface protocol and other factors, each coverage area may be arranged to operate in either a frequency division duplex (FDD) configuration or a time division duplex (TDD) configuration. In an FDD configuration, separate frequencies are used for downlink and uplink communication, so that downlink and uplink communication can occur simultaneously. In a TDD configuration, on the other hand, the same frequency is used for both downlink and uplink communication, and downlink and uplink communications are separated from each other by alternating use of the frequency over time.

The air interface in each coverage area may further have a particular frame structure that defines periodically recurring time units in which information can be communicated between the base station and UEs. For example, a frame structure could define periodically recurring frames of 10 milliseconds, each consisting of a sequence of 10 subframes of 1 millisecond each. Moreover, the example frame structure could then further divide each subframe into a sequence of smaller time units, such as a pair of resource blocks for instance. Other example frame structures are possible as well.

In an FDD system, the downlink and uplink may each separately have such a frame structure, and those frame structures may be synchronized with each other over time. Various control and traffic channels may then be defined for each link. For instance, in each downlink frame, certain subframes or portions thereof might be designated to carry page messages and various system overhead signaling such as a reference signal, and other subframes or portions thereof might be designated to carry bearer traffic from the base station to served UEs. Likewise, in each uplink frame, certain subframes or portions thereof might be designated to carry access messages and various other overhead signaling, and other subframes or portions thereof might be designated to carry bearer traffic from served UEs to the serving base station.

In a TDD system, on the other hand, the air interface may define a single such frame structure for combined downlink/uplink use, with portions of each frame alternating between downlink and uplink in a defined sequence. For example, the first three subframes of each frame may be designated for downlink use, the next two subframes may be designated for uplink use, the next three subframes may be designated for downlink use, and the last two subframes may be designated for uplink use. In each frame of such a system, certain ones of the downlink subframes or portions thereof may again be designated to carry page messages and system overhead signaling such as a reference signal, and other downlink subframes or portions thereof may be designated to carry bearer traffic to served UEs. Further, certain ones of the uplink subframes or portions thereof may be designated to carry access messages and other overhead signaling, and other uplink subframes or portions thereof may be designated to carry bearer traffic to the serving base station.

OVERVIEW

When two adjacent coverage areas operate on the same frequency as each other, communications in one coverage area may interfere with communications in the other coverage area. This type of "inter-cell interference" can greatly impact performance of a UE that is positioned at an area of overlap between the two coverage areas. In particular, as the UE engages in uplink or downlink communication on the frequency in its serving coverage area, concurrent uplink or downlink communications on the same frequency in the other coverage area may interfere with, and ultimately prevent successful receipt and processing of, the communications to or from the UE.

On the downlink in particular, two adjacent base stations (each serving one of the overlapping coverage areas) may work with each other in an inter-cell interference coordination (ICIC) process to help avoid or minimize this problem. For example, the base station serving the UE may receive from the UE a report that the UE has detected threshold signal strength from an adjacent base station (thus establishing that the UE is in the area of overlap). The serving base station may then signal through an inter-base-station link to the adjacent base station, informing the adjacent base station which time units (e.g., subframes or portions thereof—such as resource blocks) that the serving base station will be using for downlink transmission of bearer traffic to the UE, and the adjacent base station may responsively forgo assignment of those time units for downlink transmission of bearer traffic to any UE(s) that it serves. As a result, when the serving base station is transmitting bearer traffic to the UE in those designated time units, there may no interference, or greatly reduced interference, from the adjacent base station.

A problem may arise, however, in a scenario where a serving base station operates with a TDM air interface having a particular downlink-uplink sequence and the adjacent base station operates on the same frequency but with a TDM air interface that has a different downlink-uplink sequence or that is offset in time from the sequence used by the serving base station. In that scenario, applying ICIC as described above may to help to prevent the adjacent base station from engaging in downlink transmission at the same time as the serving base station is set to provide downlink transmission to the UE. However, for time units where the TDM frame structure of the adjacent base station instead defines uplink transmission and the serving base station plans to provide downlink transmission to the UE, the ICIC process may not work, since the adjacent base station would have no downlink transmission to avoid in that time unit.

Disclosed herein is a method and apparatus to help overcome this or related problems. In accordance with the disclosure, a UE that is served by a particular base station on a TDM air interface having a particular TDM frame arrangement may determine a different TDM frame arrangement of an adjacent base station and report that determined TDM frame arrangement to the serving base station. The serving base station may then determine the time units in which the TDM frame arrangement of the adjacent base station defines uplink transmission and may intentionally avoid scheduling downlink transmission to the UE in those time units. In practice, the TDM frame arrangements of the serving base station and adjacent base station could differ from each other by defining different downlink-uplink sequences and/or by being offset from each other in time.

In one aspect, for instance, the method may involve a first base station serving a UE in a connected state over a first TDD air interface defining a first TDD frame arrangement. Further, the method may involve the first base station receiving from the UE in an uplink transmission on the first TDD air interface a report of a second TDD frame arrangement used by a second base station on a second TDD air interface, with that second TDD frame arrangement being different than the first TDD frame arrangement. In turn, the method may then involve, based at least in part on the received report of the second TDD frame arrangement used by the second base station, the first base station avoiding downlink transmission of bearer traffic to the UE during times when the second TDD frame arrangement defines uplink transmission, while continuing to serve the UE in the connected state.

In another aspect, the method may involve a UE being served in a connected state by a first base station over a first TDD air interface that has a first TDD frame arrangement. Further, the method may involve the UE determining that a second base station operates with a second TDD frame arrangement, the second TDD frame arrangement being different than the first TDD frame arrangement. And the method may involve the UE reporting to the first base station in an uplink transmission on the first TDD air interface an indication of the determined second TDD frame arrangement of the second base station, so as to enable the first base station to avoid downlink transmission of bearer traffic to the UE at times when the second TDD air interface defines uplink transmission.

And in still another aspect, the apparatus may take the form of a base station having an antenna structure and a processing unit. The antenna structure may function to engage in wireless communication over an air interface. And the processing unit may be arranged to receive via the antenna structure from a user equipment device (UE) served by the base station a report of a time division duplex (TDD) frame arrangement of a neighboring air interface and, in response to the received report, to prevent the antenna structure from transmitting bearer traffic to the UE at times when the TDD frame arrangement of the neighboring air interface defines uplink transmission, while allowing the antenna structure to transmit bearer traffic to the UE at one or more times when the TDD frame arrangement of the neighboring air interface defines downlink transmission.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

The present method and apparatus will be described by way of example in a scenario where a UE is being served by an LTE base station over a TDD LTE air interface, and an adjacent LTE base station provides service on a TDD LTE air interface having a different frame arrangement, such as a different TDD frame structure and/or a TDD frame structure that is not synchronized in time with that of the UE's serving base station, but likely operating on the same frequency channel. In accordance with the method, the UE may report to its serving base station the TDD frame arrangement of the adjacent base station. Based on the frame arrangement of the adjacent base station, the serving base station may then dynamically avoid downlink transmissions of bearer traffic to the UE at times when the adjacent base station's frame arrangement would define uplink transmission, thereby helping to prevent uplink transmissions in the adjacent air interface from interfering with the downlink transmissions to the UE.

It should be understood, however, that the method and apparatus could apply as well in other scenarios. For example, the air interfaces of the base stations could operate according to other air interface protocols, possibly different than each other. As another example, the serving base station's air interface could be an FDD air interface rather than TDD air interface, in which case the serving base station could likewise avoid downlink transmission of bearer traffic to the UE at times when the adjacent air interface defines uplink transmission. Other variations are possible as well.

Figure 1:
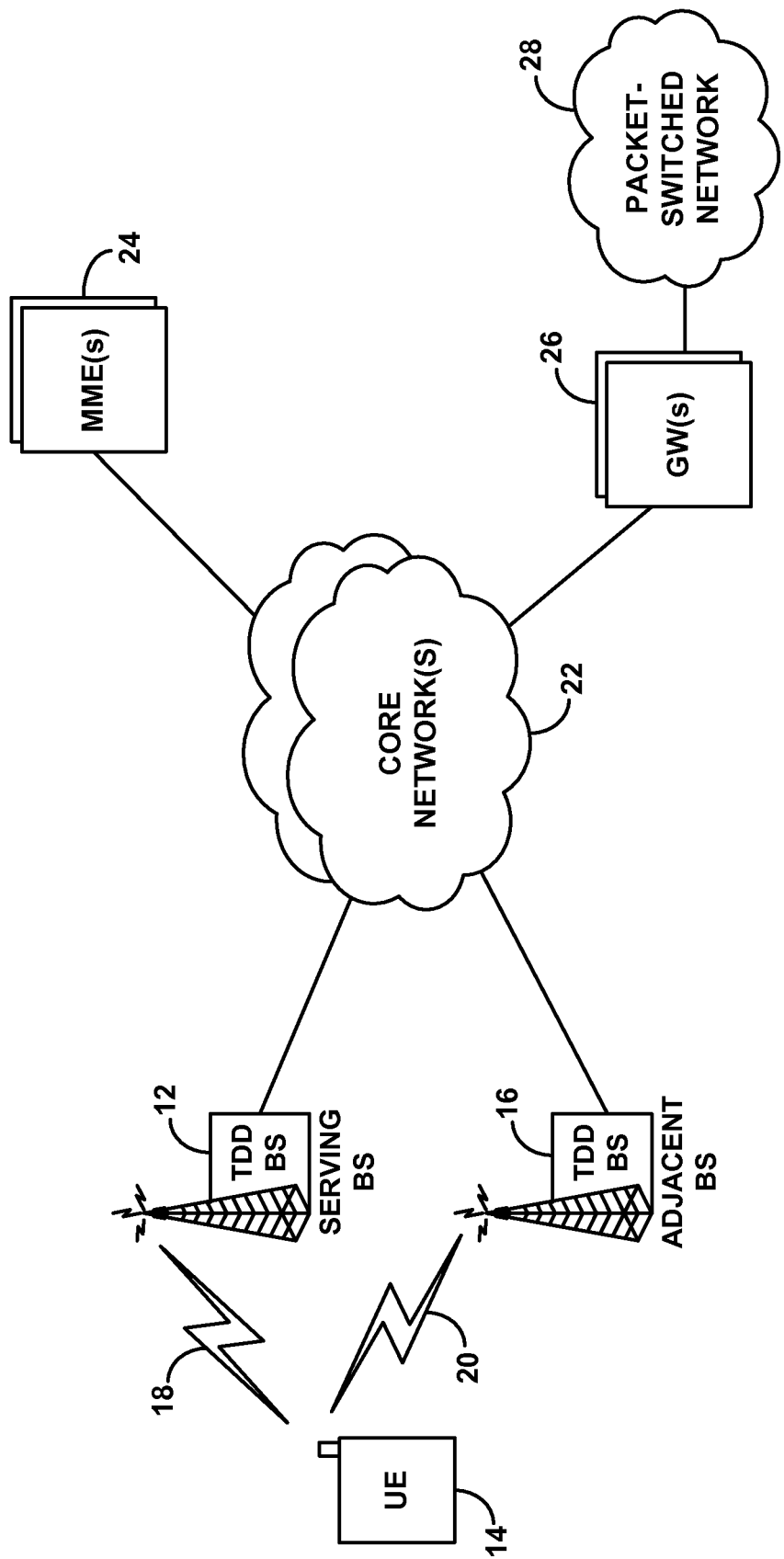
FIG. 1 is a simplified block diagram of an example network arrangement in which embodiments of the present method can be implemented.

Referring to the drawings, as noted above, FIG. 1 is a simplified block diagram depicting an example network arrangement in which embodiments of the present method can be implemented.

As shown, the example network includes a base station 12 that serves a UE 14 with TDD LTE coverage, and an adjacent base station 16 that also provides TDD LTE coverage extending to the UE's location. In particular, base station 12 radiates to provide a wireless coverage area (e.g., a cell or cell sector) that defines a first TDD air interface 18, and base station 12 serves UE 14 over that air interface. And adjacent base station 16 then also radiates to provide a wireless coverage area extending to the UE's location, defining a second TDD air interface 20.

In LTE parlance, these base stations are known as "eNodeBs," but this description will continue to refer to them more generally as "base stations." Further, although these base stations are shown separately in the figure, they could be co-located, possibly sharing network equipment such as a tower or the like.

In practice, base stations 12 and 16 may be owned and/or operated by the same wireless service provider. Alternatively, the base stations may be owned and/or operated by separate wireless service providers or others. Further, the base stations may take various forms, such as macro base stations (typically with antenna towers covering large public areas) or pico/femto base stations (of the type typically taking up less space and serving much smaller areas). In any event, each base station may include one or more antenna arrangements and associated equipment, for radiating to define one or more coverage areas in which to serve UEs such as UE 12, and may further include backhaul connections for coupling with other network equipment.

As further shown, base stations 12 and 16 are communicatively linked with one or more core networks 22, which may be operated by the one or more wireless service providers. Core network(s) 18 then provide connectivity with one or more mobility management entities (MMES) 24 and one or more gateways (GWs) 26, which in turn provide connectivity with a packet-switched network 28 such as the Internet.

In practice, the MME(s) 24 may function as a signaling controller to facilitate setup of data connectivity and the like via an appropriate gateway 26, interworking with one or more base stations in the process. For instance, when a UE is operating in an idle mode (Radio Resource Control (RRC) idle mode) within a base station coverage area and the MME seeks to page the UE, the MME may direct the base station (and perhaps one or more other base stations in a common tracking area) to page the UE. Further, when the UE seeks to engage in communication of bearer traffic (such as Internet browsing, voice over Internet Protocol (VoIP) or the like, possibly in response to a page message from the base station), the UE may transmit an RRC connection request to the base station, the base station may assign a temporary identifier to the UE for use in air interface resource block allocation, the UE may transition to be served in an RRC connected mode, and the MME may set up an access bearer between the base station and the gateway to facilitate packet data communication. In the connected mode, the base station may then assign to the UE various air interface resource blocks for use to carry bearer traffic to the UE and from the UE.

Although not shown expressly, base stations 12 and 16 may also be arranged to engage in signaling communication with each other, so as to facilitate ICIC for instance. In particular, the base stations may communicate with each other over a logical "X2" link, which may physically pass through the core network(s) 22 or over a more direct physical connection between the base stations.

As noted above, in the example scenario, base station 12 serves UE 14 with TDD LTE coverage over TDD air interface 18, while adjacent base station 16 also provides TDD LTE coverage over TDD air interface 20 extending to the UE's location. In an example LTE implementation, each of these TDD air interfaces may have a respective TDD frame arrangement such as a particular TDD frame structure having particular timing. By way of example, as discussed above, each air interface may have a TDD frame structure that defines periodically recurring frames of 10 milliseconds, each consisting of a sequence of 10 subframes of 1 millisecond each, with each subframe consisting of two timeslots or resource blocks of 0.5 milliseconds each, and with certain subframes per frame being used for downlink communications and other subframes per frame being used for uplink communications. Further, each TDD frame arrangement may be synchronized to a particular reference time, such that each sequential frame would essentially occur at an integer multiple of 10 milliseconds from that reference time.

Figure 2:
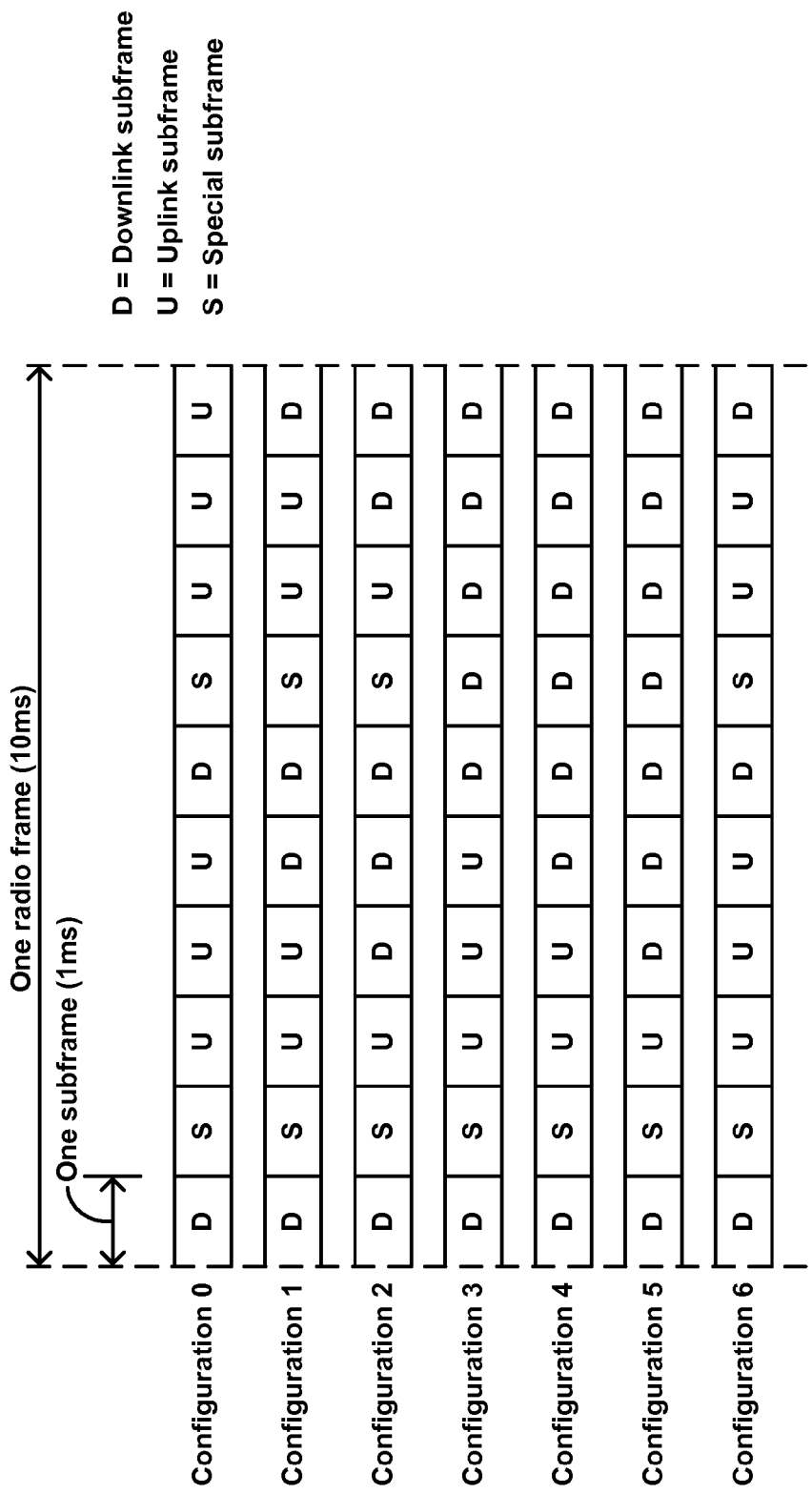
FIG. 2 is an illustration of various LTE frame structures.

LTE defines seven different TDD frame structures, which differ from each other in terms of which subframes are set aside for downlink communication and which subframes are set aside for uplink communication. FIG. 2 depicts these frame structures, labeled as configurations 0 through 6. In each of these frame structures, subframes set aside for downlink communication are labeled as "D" and subframes set aside for uplink communication are labeled as "U". Further, in accordance with LTE, where a frame transitions over time from downlink to uplink, the frame includes a "special subframe" that is not used for either downlink or uplink communication, designed to give a UE time to make the transition to uplink communication. These special subframes are labeled as "S".

Each LTE base station may be configured to operate with a given one of these LTE frame structures and may broadcast an overhead specification of its frame structure so that UEs being served by the base station can operate with the applicable frame structure. For instance, the base station may broadcast an indication of its configuration (such as the configuration number or other configuration identifier) in a System Information Block #2 (SIB2) at a predefined position in a radio frame, and a served UE may read that SIB2 indication to determine the frame structure used by the base station.

Furthermore, each LTE frame may carry predefined data that functions to define the timing or synchronization of the frame structure, so that UEs seeking to read frames from a given base station can look for that predefined data as a basis to determine where frames start, so as to be able to then read particular subframes and portions thereof. In particular, each frame may contain a primary synchronization signal in a predefined location per frame (such as in the last OFDM symbol of the first timeslot of the first subframe) so a UE can scan for that signal to determine the frame timing.

In addition, each LTE frame may carry cell identification information, in a secondary synchronization signal (e.g., in the symbol before the primary synchronization signal), so once a UE has determined the frame timing, the UE can then read the secondary synchronization signal to determine the cell identification.

In practice, the TDD frame arrangement of the air interface 18 provided by serving base station 12 may be different than the TDD frame arrangement of the air interface 20 provided by adjacent base station 16. By way of example, even if both frame arrangements define 10 millisecond frames with ten 1 millisecond subframes each, the base stations may be configured to use different TDD frame structures. For instance, air interface 18 of serving base station 12 might be arranged to use configuration 2, whereas air interface 20 of adjacent base station 16 might be arranged to use configuration 1. Further, regardless of whether the air interfaces have the same frame structure, the frame timing under air interface 18 might be different than the frame timing of air interface 20, so that the frames of one air interface are offset in time from those of the other air interface. For instance, if a 10 millisecond frame of air interface 18 begins at time T, a 10 millisecond frame of air interface 20 might be shifted in time by 0.25 milliseconds and might therefore begin at time T+0.25 milliseconds.

In accordance with the present method, as described above, UE 14 may determine and report to base station 12 the TDD frame arrangement used by base station 16, so that base station 12 can then avoid providing downlink transmission of bearer traffic to the UE at times when the TDD frame arrangement of base station 16 defines uplink transmission. Optimally, the trigger for the UE providing such a report to base station 16 may be the UE detecting a threshold strong signal from base station 18, which the UE may determine by measuring strength of the reference signal broadcast by base station 18 on air interface 20. In addition or alternatively, the trigger could be the UE determining that the TDD frame arrangement used by base station 16 is different than that used by base station 12.

The UE may determine the TDD frame arrangement of air interface 20 in various ways. By way of example, the UE may read an overhead signal broadcast from base station 16, such as a SIB2 message as discussed above, which may specify the frame structure used by base station 16. Furthermore, by reading synchronization signals broadcast by base station 12 and base station 16, the UE may determine whether the frames of air interface 20 are synchronized with those of air interface 18 and, if not, a timing offset of one in relation to the other. For instance, using the example above, the UE might determine that the frames of air interface 20 are delayed by 0.25 milliseconds compared with those of air interface 18.

As another example, the UE may monitor transmission from base station 16 to determine when base station 16 actually provides downlink transmission per frame and thus what frame structure base station 16 uses. To do this in practice, once the UE determines the frame timing of air interface 20, the UE may then monitor transmission from base station 16 to determine when a reference signal is present (i.e., the times when the UE detects presence of the reference signal) and when a reference signal is not present (i.e., the times when the UE detects the absence of the reference signal, or does not detect the presence of the reference signal). In a representative TDD frame structure, the reference signal would be present in each downlink subframe but would not be present in any uplink subframe or special subframe. Thus, by determining when the reference signal is present and when the reference signal is not present, the UE could determine the downlink subframe allocation and thus the frame configuration used by base station 16. In addition, the UE may maintain correlation data that specifies the configuration identifier of each possible frame structure, and the UE may refer to that data to determine the configuration identifier corresponding with the determined frame structure. Furthermore, here too, the UE may determine a timing offset, if any, between the frames of air interface 20 and those of air interface 18.

Once the UE has determined the frame arrangement of air interface 20, the UE may then report that determined frame arrangement to base station 12. The UE may do this at various times, depending on the implementation. By way of example, if the UE is currently being served in an RRC idle mode by base station 12, the UE could report the frame arrangement of base station 16 to base station 12 when the UE sends an RRC connection request to base station 12, such as in the RRC connection request message or another message that the UE transmits on the uplink of air interface 18 to base station 12. Alternatively, if the UE is already being served in an RRC connected mode by base station 12, the UE may transmit the report to base station 12 in a shared channel on the uplink of air interface 18. In either case, the UE may then be served in an RRC connected mode, and base station 12 may use the reported frame arrangement of base station 16 as a basis to avoid providing downlink transmission of bearer traffic to the UE at times when the frame arrangement of base station 16 defines uplink transmission.

Further, the report that the UE provides to base station 12 may indicate or specify the frame arrangement of air interface 20 in various ways. For example, if the UE determined the configuration identifier of air interface 20 (such as by reading the configuration identifier from a SIB2 message for instance, or by determining the actual frame structure and correlating that to the configuration identifier), the UE may report the configuration identifier. Alternatively, if the UE determined the actual frame structure (such as by monitoring when the reference signal is present), the UE may report that actual frame structure in a coded manner that base station would then be configured to read interpret. In addition, if the UE determined a time offset of air interface 20 in relation to air interface 18, the UE may report a delta value specifying that offset or another indication of that offset.

Figure 3:
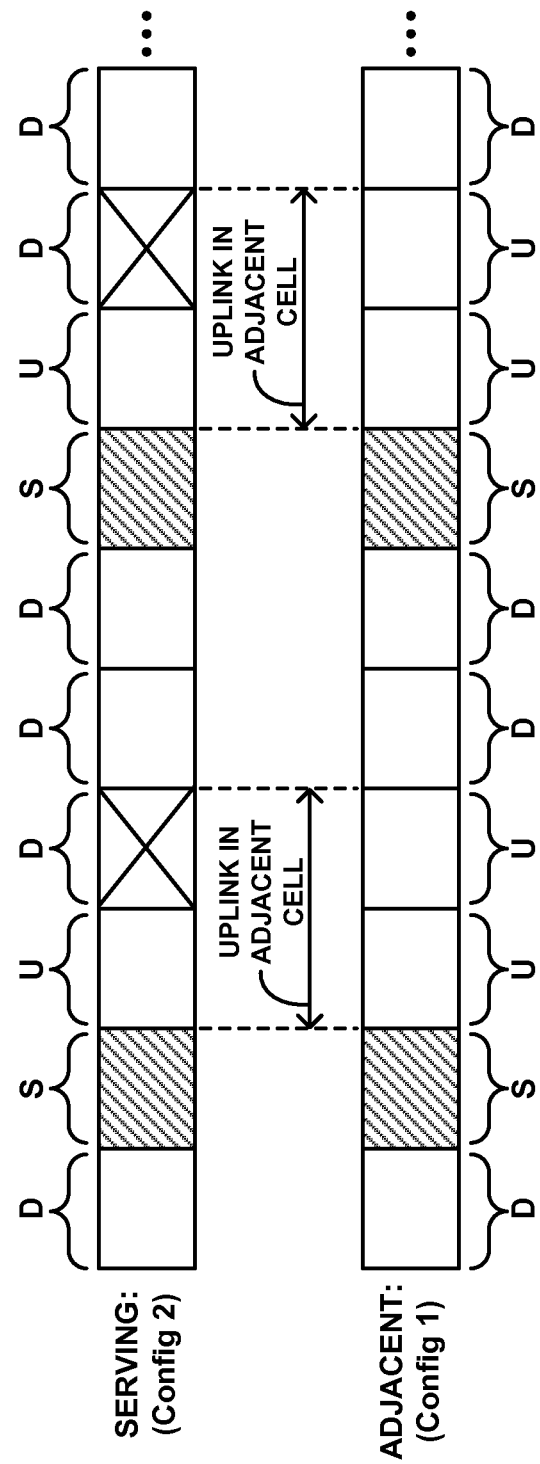
FIG. 3 is an illustration of different LTE frame structures in neighboring coverage areas.
Figure 4:
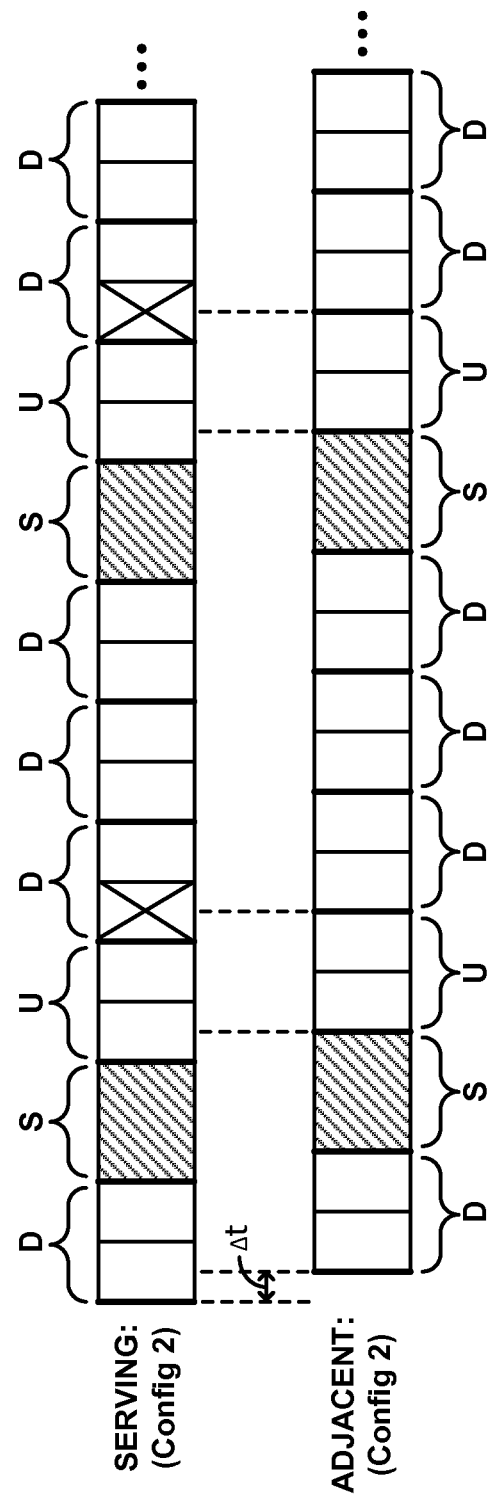
FIG. 4 is an illustration of different LTE frame timing in neighboring coverage areas.

Provided with this report, base station 12 may then avoid providing downlink transmission of bearer traffic to the UE at times when air interface 20 defines uplink transmission. FIGS. 3 and 4 illustrate how this might work in practice.

FIG. 3 illustrates a scenario where the frame timing of air interface 18 and the frame timing of air interface 20 are synchronized, but where the two air interfaces have different frame structures. In particular, the figure illustrates air interface 18 (of the serving base station 12) using LTE frame configuration 2, and air interface 20 (of the adjacent base station 16) using LTE frame configuration 1.

With this arrangement, air interface 20 defines uplink transmission in the third and fourth subframes of each frame and in the eighth and ninth subframes of each frame. Given that, serving base station 12 would avoid scheduling downlink transmission of bearer traffic to the UE in the third, fourth, eighth, and ninth subframes of each frame. With frame configuration 2 as used by base station 12, this means that base station would 12 would avoid scheduling downlink transmission of bearer traffic to the UE in the fourth and ninth subframes, as represented by the "X" in each of those subframes. Phrased another way, base station 12 may blank out those particular downlink subframes for the UE. Thus, as base station 12 allocates resource blocks for carrying bearer traffic on air interface 18 to the UE, base station 12 may treat the fourth and ninth subframes as unavailable for that purpose, while still possibly scheduling downlink transmission of bearer traffic to one or more other UEs those subframes, and while continuing to schedule downlink transmission of bearer traffic to the UE in one or more other downlink subframes of air interface 18.

FIG. 4 next illustrates a scenario where the frame structure of air interface 20 is the same as that of air interface 18 (both configuration 2 by way of example) but where the air interfaces are not synchronized with each other. In particular, FIG. 4 depicts a scenario in line with the example provided above, where air interface 20 is delayed by 0.25 milliseconds from air interface 18. In this arrangement, base station 12 may more specifically determine when to not schedule downlink transmission of bearer traffic to the UE. In particular, as shown here, the frame structure of air interface 20 defines downlink transmission at the third and eighth subframes. At issue is then when base station 12 should avoid scheduling downlink transmission of bearer traffic to the UE.

In this scenario, base station 12 may avoid downlink transmission of bearer traffic to the UE on a resource block basis rather than more generally on a subframe basis. In particular, as shown, the downlink portion of air interface 18 that exists during the uplink third subframe of air interface 20 is the first resource block of the fourth subframe. Similarly, the downlink portion of air interface 18 that exists during the uplink eighth subframe of air interface 20 is the first resource block of the ninth subframe. Thus, base station 12 may avoid scheduling of those two particular resource blocks per frame for downlink transmission of bearer traffic to the UE. Moreover, the base station 12 could even carry out this process more granularly, by focusing on assignment and use of particular resource elements, which are sub-components of resource blocks.

In particular, in a scenario where the report that base station 12 receives from the UE indicates a timing difference between the TDD frame structure of air interface 18 and the TDD frame structure of air interface 20, base station 12 may determine read that timing difference. Based on that timing difference, base station 12 may then determine that a particular resource block of a particular downlink subframe of the downlink/uplink sequence defined by air interface 18 aligns in time with (i.e., occurs in whole or in part at the same time as) a particular resource block of a particular downlink subframe of the downlink/uplink sequence defined by air interface 20. Responsive to making that determination, base station 12 may then avoid downlink transmission of bearer traffic to the UE in that particular resource block of the particular downlink subframe of air interface 18.

Note that, in addition to the frame structures of air interface 18 and air interface 20 not being synchronized with each other in time, it is also possible that the frame structures may be different from each other, such as different configurations. Thus, in practice, base station 12 may face a combination of scenarios like those in FIGS. 3 and 4 and may similarly determine when to not schedule downlink transmission of bearer traffic to the UE.

Figure 5:
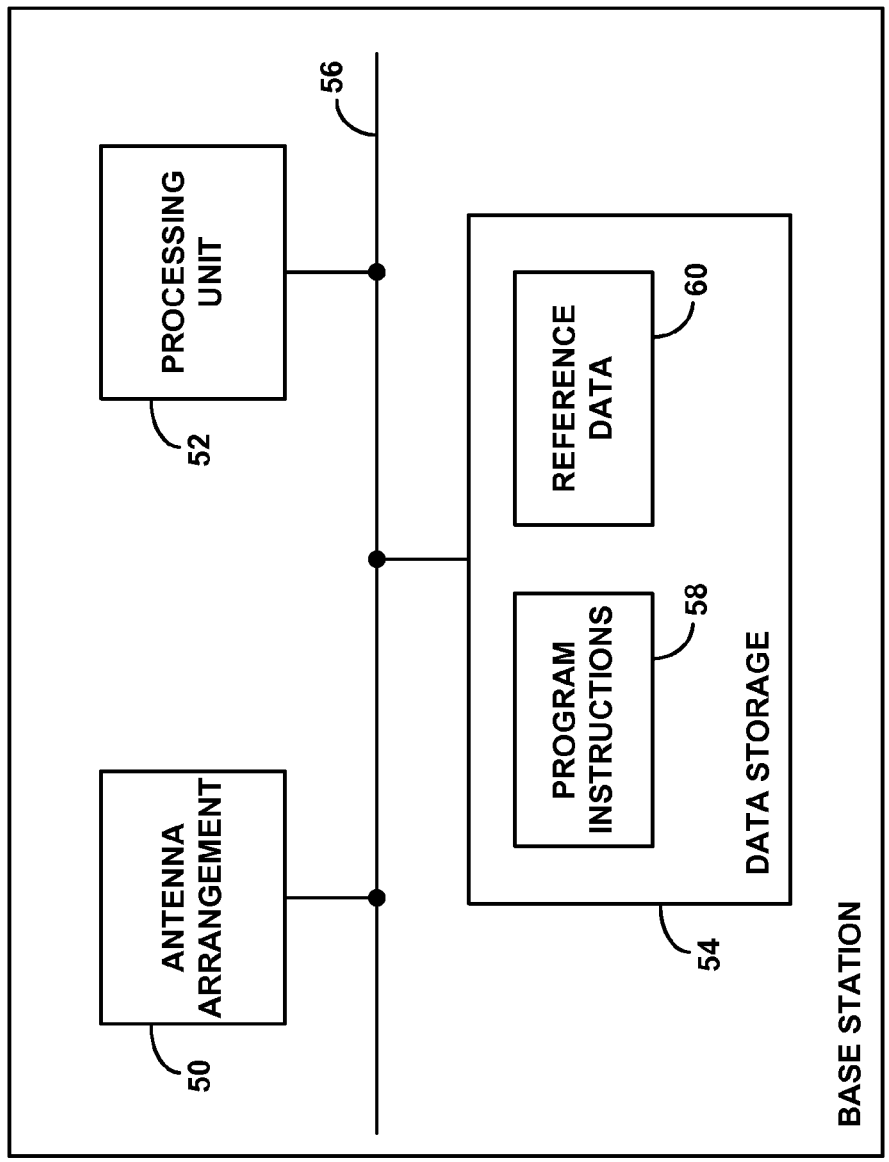
FIG. 5 is a simplified block diagram of a base station operable in the arrangement of FIG. 1.

FIG. 5 is next a simplified block diagram of a base station, such as base station 12, showing some of the functional components that may be included in such an apparatus in accordance with the present disclosure. As shown in FIG. 5, the example base station includes an antenna arrangement 50, a processing unit 52, and data storage 54, all of which may be communicatively linked together by a system bus, network, or other connection mechanism 56 and may be integrated together, distributed, or provided in ways other than that shown and described.

Antenna arrangement 50 may include one or more antennas and a power amplifier, possibly mounted on a tower or situated in some other manner, and may be configured to radiate so as to provide a wireless coverage area defining an air interface through which the base station may communicate with served UEs. Processing unit 52 may then comprise one or more general purpose processors (e.g., microprocessors) and/or one or more special purpose processors (e.g., application specific integrated circuits). And data storage 54 may comprise one or more volatile and/or non-volatile storage components, such as magnetic, optical, or flash storage for instance.

As shown, data storage 54 may hold program instructions 58 and reference data 60. The program instructions 58 may be executable by the processing unit 52 to carry out various base station functions described herein. And the reference data 60 may include data generated or used by the processing unit 52 when executing the program instructions, such as data that correlates TDD frame structures with frame configuration identifiers, data that specifies portions of frames that should not be scheduled for use to carry downlink transmission of bearer traffic on a per UE basis, and other scheduling data for instance.

Figure 6:
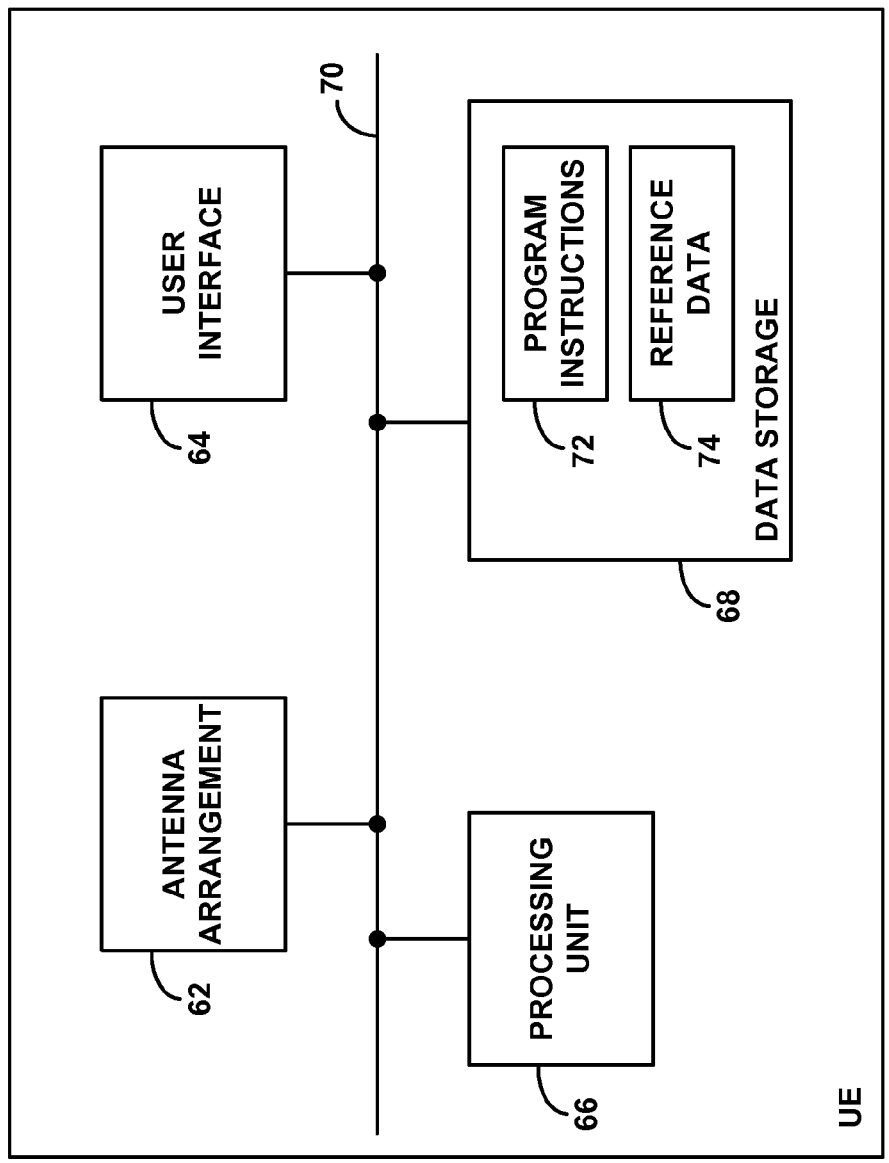
FIG. 6 is a simplified block diagram of a UE operable in the arrangement of FIG. 1.

FIG. 6 is next a simplified block diagram of a UE, such as UE 14, showing some of the functional components that may be included in such an apparatus in accordance with the present disclosure. As shown, the example UE includes an antenna arrangement 62, a user interface 64, a processing unit 66, and data storage 68, all of which may be communicatively linked together by a system bus, network, or other connection mechanism 70 and may be integrated together, distributed, or provided in ways other than that shown and described.

Antenna arrangement 62 may include one or more antennas and a power amplifier, and may be configured to engage in air interface communication with base stations such as base stations 12 and 16 for instance. User interface 64 (if applicable) may include components for providing output to a user (such as a display screen, audio speaker, and the like) and components for receiving input from a user (such as a touch-panel, a microphone, a keypad, and the like). Processing unit 66 may then comprise one or more general purpose processors (e.g., microprocessors) and/or one or more special purpose processors (e.g., application specific integrated circuits). And data storage 68 may comprise one or more volatile and/or non-volatile storage components, such as magnetic, optical, or flash storage for instance.

As shown, data storage 68 may hold program instructions 72 and reference data 74. The program instructions 72 may be executable by the processing unit 66 to carry out various UE functions described herein. And the reference data 74 may include data generated or used by the processing unit 66 when executing the program instructions, such as data that correlates TDD frame structures with frame configuration identifiers, data that specifies portions of frames scheduled for communicating bearer traffic, and the like.

Figure 7:
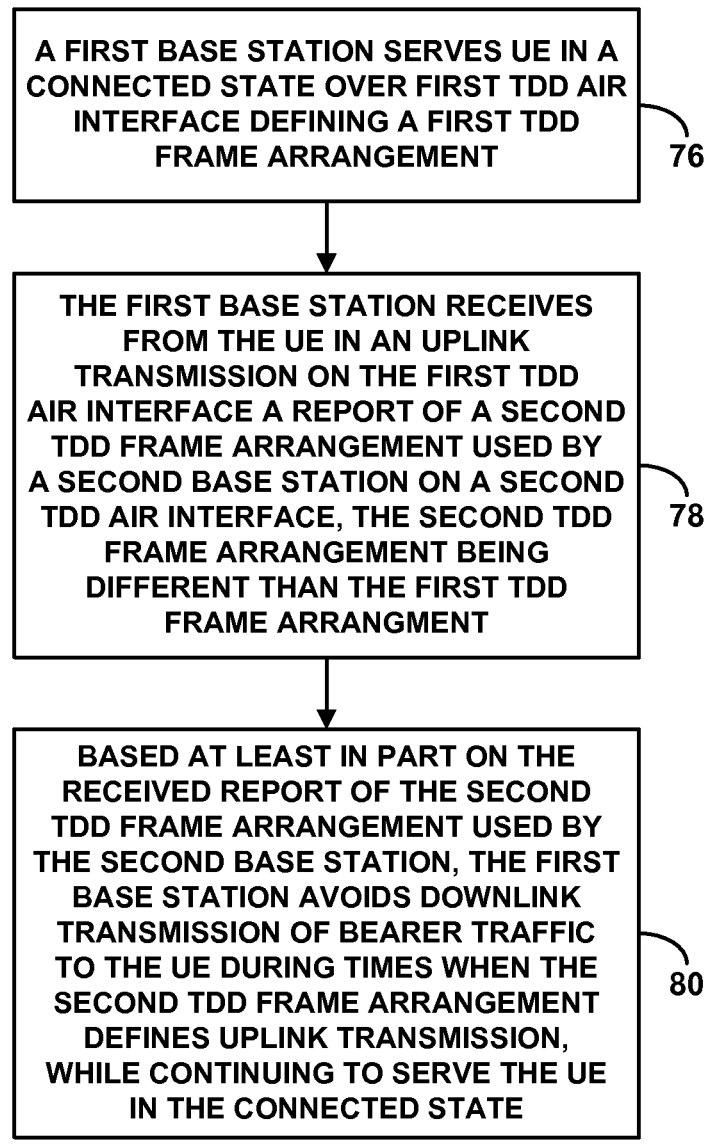
FIG. 7 is a flow chart depicting functions that can be carried out in accordance with an example method.

FIG. 7 is next a flow chart depicting a set of functions that can be carried out in accordance with the present disclosure. As shown in FIG. 7, at block 76, the method includes a first base station serving a UE in a connected state over a first TDD air interface defining a first TDD frame arrangement. At block 78 (which may happen before or during the function of block 76), the method includes the first base station receiving from the UE in an uplink transmission on the first TDD air interface a report of a second TDD frame arrangement used by a second base station on a second TDD air interface, the second TDD frame arrangement being different than the first TDD frame arrangement. At block 80, the method then includes, based at least in part on the received report of the second TDD frame arrangement used by the second base station, the first base station avoiding downlink transmission of bearer traffic to the UE during times when the second TDD frame arrangement defines uplink transmission, while continuing to serve the UE in the connected state (e.g., continuing to schedule downlink transmission to the UE).

With this method, as the first base station avoids downlink transmission of bearer traffic to the UE during times when the second TDD frame arrangement defines uplink transmission, the first base station may still transmit bearer traffic to the UE during one or more times when the second TDD frame arrangement defines downlink transmission. Furthermore, the first base station and the second base station may signal with each other so as to apply ICIC for the UE as discussed above, such as to have one of the base stations avoid using downlink resource blocks that the other base station is scheduling for downlink transmission to the UE.

Figure 8:
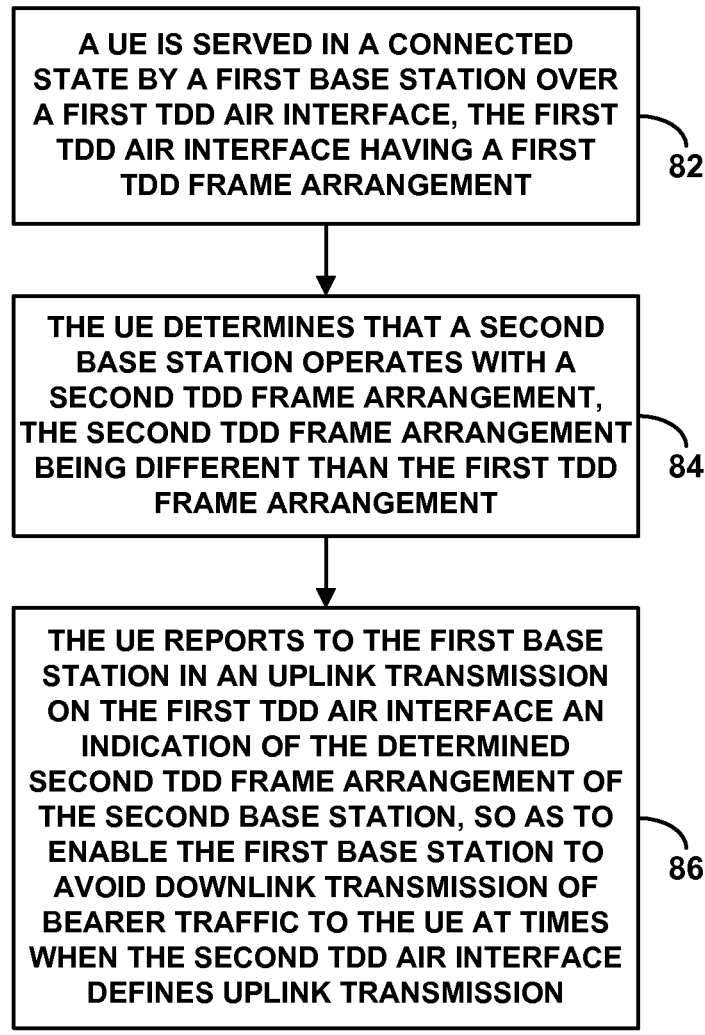
FIG. 8 is a flow chart depicting other functions that can be carried out in accordance with an example method.

FIG. 8 is next another flow chart depicting functions that can be carried out in accordance with the present disclosure. As shown in FIG. 8, at block 82, the method may involve a UE being served in a connected state by a first base station over a first TDD air interface, the first TDD air interface having a first TDD frame arrangement. At block 84 (which may happen before or during the function of block 82), the UE further determines that a second base station operates with a second TDD frame arrangement, the second TDD frame arrangement being different than the first TDD frame arrangement. And at block 86, the method then involves the UE reporting to the first base station in an uplink transmission on the first TDD air interface an indication of the determined second TDD frame arrangement of the second base station, so as to enable the first base station to avoid downlink transmission of bearer traffic to the UE at times when the second TDD air interface defines uplink transmission.

The functions of FIGS. 7 and 8 could further be integrated together into a combined method that would involve functions of both a UE and a base station, in line with the discussion above.

Exemplary embodiments have been described. Those skilled in the art will appreciate, however, that changes may be made from the described embodiments without departing from the intended scope.

We claim:

1. A method comprising:
   a first base station serving a user equipment device (UE) in a connected state over a first time division duplex (TDD) air interface defining a first TDD frame arrangement, wherein the first TDD frame arrangement defines a first downlink-uplink sequence;
   the first base station receiving from the UE in an uplink transmission on the first TDD air interface a report of a second TDD frame arrangement used by a second base station on a second TDD air interface, wherein the second TDD frame arrangement defines a second downlink-uplink sequence and is different than the first TDD frame arrangement in at least one respect selected from the group consisting of (i) the second downlink-uplink sequence being different than the first downlink-uplink sequence and (ii) the first TDD frame arrangement and second TDD frame arrangement being unsynchronized with each other in time; and
   based at least in part on the received report of the second TDD frame arrangement used by the second base station, the first base station avoiding downlink transmission of bearer traffic to the UE during times when the second TDD frame arrangement defines uplink transmission, while continuing to serve the UE in the connected state.

2. The method of claim 1, further comprising, while avoiding downlink transmission of bearer traffic to the UE during times when the second TDD frame arrangement defines uplink transmission, the first base station transmitting bearer traffic to the UE during one or more times when the second TDD frame arrangement defines downlink transmission.

3. The method of claim 2, further comprising the first base station radiating to provide a first wireless coverage area, wherein the first coverage area overlaps with a second wireless coverage area provided by the second base station.

4. The method of claim 3, further comprising the first base station signaling with the second base station to apply inter-cell interference coordination for the UE.

5. The method of claim 4, wherein signaling with the second base station to apply inter-cell interference coordination for the UE comprises:
   providing the second base station with an indication of one or more air interface resource blocks the first base station assigns to the UE for downlink transmission to the UE on the first TDD air interface, so as to cause the second base station to not assign the same resource blocks for downlink transmission on the second TDD air interface.

6. The method of claim 1, wherein the first TDD frame arrangement has a first configuration identifier, wherein the second TDD frame arrangement has a second configuration identifier different than the first configuration identifier, and wherein the received report specifies the second configuration identifier.

7. The method of claim 6, further comprising (i) the UE receiving from the second base station a specification of the second configuration identifier of the second TDD frame arrangement, and (ii) the UE generating the report based on the received specification and transmitting the report in the uplink transmission to the first base station.

8. The method of claim 1, wherein the received report is generated by (i) the UE scanning transmissions from the second base station to detect downlink transmissions from the second base station and (ii) the UE determining based on timing of the detected downlink transmissions what the second TDD frame arrangement is.

9. The method of claim 8, further comprising the UE generating the received report and transmitting the report to the first base station.

10. The method of claim 1, wherein the first TDD air interface is an orthogonal frequency division multiple access (OFDMA) air interface, and wherein the second TDD air interface is also an OFDMA air interface, and wherein the first and second air interfaces operate on a common frequency channel.

11. The method of claim 1,
   wherein the first TDD frame arrangement defines recurring first frames each having a plurality of first subframes and each first subframe having a plurality of first resource blocks, wherein the plurality of first subframes in each first frame has the first downlink-uplink sequence, and
   wherein the second TDD frame arrangement defines recurring second frames each having a plurality of second subframes and each second subframe having a plurality of second resource blocks, wherein the plurality of second subframes in each second frame has the second downlink-uplink sequence.

12. The method of claim 11,
   wherein the first downlink-uplink sequence and second downlink-uplink sequence are different than each other but the plurality of first subframes is synchronized in time with the plurality of second subframes, and
   wherein the first base station avoiding downlink transmission of bearer traffic to the UE during times when the second TDD frame arrangement defines uplink transmission comprises the first base station blanking out for the UE one or more full downlink subframes of the first sequence that each align in time with an uplink subframe of the second sequence.

13. The method of claim 11,
   wherein the first TDD frame arrangement differs from the second TDD frame arrangement at least in that the first TDD frame arrangement and second TDD frame arrangement are not synchronized with each other in time,
   wherein the received report indicates a timing difference between the first TDD frame arrangement and the second TDD frame arrangement, and
   wherein the first base station avoiding downlink transmission of bearer traffic to the UE during times when the second TDD frame arrangement defines uplink transmission comprises (i) the first base station determining based on the timing difference indicated in the received report that a particular first resource block of a particular downlink subframe of the first TDD frame arrangement aligns in time with a particular second resource block of a particular uplink subframe of the second TDD frame arrangement and (ii) responsive to the determining, the first base station avoiding downlink transmission of bearer traffic to the UE in that particular first resource block of the particular downlink subframe.

14. The method of claim 13, wherein, in addition to the first TDD frame arrangement and second TDD frame arrangement not being synchronized with each other in time, the first sequence and second sequence are different than each other.

15. A method comprising:

a user equipment device (UE) being served in a connected state by a first base station over a first time division duplex (TDD) air interface, the first TDD air interface having a first TDD frame arrangement, wherein the first TDD frame arrangement defines a first downlink-uplink sequence;

the UE determining that a second base station operates with a second TDD frame arrangement, the second TDD frame arrangement defining a second downlink-uplink sequence and being different than the first TDD frame arrangement in at least one respect selected from the group consisting of (i) the second downlink-uplink sequence being different than the first downlink-uplink sequence and (ii) frames of the first TDD frame arrangement being unsynchronized with frames of the second TDD arrangement; and the UE reporting to the first base station in an uplink transmission on the first TDD air interface an indication of the determined second TDD frame arrangement of the second base station, so as to enable the first base station to avoid downlink transmission of bearer traffic to the UE at times when the second TDD air interface defines uplink transmission.

16. The method of claim 15, wherein determining that the second base station operates with the second TDD frame arrangement comprises (i) scanning transmissions from the second base station to detect downlink transmissions from the second base station and (ii) determining based on timing of the detected downlink transmissions that the second base station operates with the second TDD frame arrangement.

17. The method of claim 15, wherein determining that the second base station operates with the second TDD frame arrangement comprises (i) receiving from the second base station in an overhead signal a configuration identifier representing the second TDD frame arrangement used by the second base station.

18. The method of claim 15, wherein the first TDD frame arrangement and second TDD frame arrangement differ from each other at least in part in that frames of the first TDD frame arrangement are not synchronized in time with frames of the second TDD frame arrangement, and wherein reporting to the first base station in the uplink transmission on the first TDD air interface the indication of the determined second TDD frame arrangement of the second base station comprises reporting to the first base station a frame timing offset between the first TDD frame arrangement and the second TDD frame arrangement.

19. A base station comprising:

an antenna structure for engaging in wireless communication over an air interface; and a processing unit arranged to receive via the antenna structure from a user equipment device (UE) served by the base station a report of a time division duplex (TDD) frame arrangement of a neighboring air interface and, in response to the received report, to prevent the antenna structure from transmitting bearer traffic to the UE at times when the TDD frame arrangement of the neighboring air interface defines uplink transmission, while allowing the antenna structure to transmit bearer traffic to the UE at one or more times when the TDD frame arrangement of the neighboring air interface defines downlink transmission, wherein the TDD frame arrangement of the neighboring air interface defines a particular downlink-uplink sequence, wherein the first air interface defines a TDD frame arrangement different than that of the neighboring air interface.

* * * * *